(12) United States Patent
Kleckner et al.

(10) Patent No.: US 7,649,049 B2
(45) Date of Patent: *Jan. 19, 2010

(54) RUBBER COMPOSITION CONTAINING A POLYMER NANOPARTICLE

(75) Inventors: James P. Kleckner, Akron, OH (US); William J. O'Briskie, Uniontown, OH (US)

(73) Assignee: Bridgestone Corporation (JP)

( * ) Notice: Subject to any disclaimer, the term of this patent is extended or adjusted under 35 U.S.C. 154(b) by 10 days.

This patent is subject to a terminal disclaimer.

(21) Appl. No.: 11/642,795

(22) Filed: Dec. 20, 2006

(65) Prior Publication Data

US 2008/0149238 A1 Jun. 26, 2008

(51) Int. Cl.
*C08L 53/00* (2006.01)
(52) U.S. Cl. .......................................................... 525/88
(58) Field of Classification Search ..................... 525/88
See application file for complete search history.

(56) References Cited

U.S. PATENT DOCUMENTS

| | | | |
|---|---|---|---|
| 2,531,396 A | 11/1950 | Carter et al. |
| 3,598,884 A | 8/1971 | Wei et al. |
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,326,008 A | 4/1982 | Rembaum |
| 4,386,125 A | 5/1983 | Shiraki et al. |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fulwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 5,036,138 A | 7/1991 | Stamhuis et al. |
| 5,066,729 A | 11/1991 | Stayer, Jr. et al. |
| 5,073,498 A | 12/1991 | Schwartz et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |

(Continued)

FOREIGN PATENT DOCUMENTS

CA       2127919       3/1995

(Continued)

OTHER PUBLICATIONS

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

(Continued)

*Primary Examiner*—Edward J Cain
(74) *Attorney, Agent, or Firm*—Meredith E. Hooker; Nathan Lewis

(57) ABSTRACT

Provided is a composition comprising a rubber and a polymer nano-particle comprising a poly(mono-vinyl aromatic) core and a poly(mono-vinyl aromatic-conjugated diene) surface layer, wherein the core of the polymeric nano-particle has a glass transition temperature (Tg) of between about 150° C. and about 600° C. Also provided is a composition comprising at least two (mono-vinyl aromatic-conjugated diene) copolymer rubbers and a polymeric nano-particle comprising a poly (mono-vinyl aromatic) core and a poly(mono-vinyl aromatic-conjugated diene) surface layer; wherein the core of the polymeric nano-particle has a glass transition temperature (Tg) of between about 150° C. and about 600° C., and the poly(mono-vinyl aromatic-conjugated diene) surface layer of the polymeric nano-particle comprises a mono-vinyl aromatic content that is between about 50 percent and about 150 percent that of the mono-vinyl content of one of the (mono-vinyl aromatic-conjugated diene) copolymer rubbers.

22 Claims, 1 Drawing Sheet

U.S. PATENT DOCUMENTS

| | | | |
|---|---|---|---|
| 5,438,103 A | 8/1995 | DePorter et al. | |
| 5,447,990 A | 9/1995 | Noda et al. | |
| 5,462,994 A | 10/1995 | Lo et al. | |
| 5,514,734 A | 5/1996 | Maxfield et al. | |
| 5,514,753 A | 5/1996 | Ozawa et al. | |
| 5,521,309 A | 5/1996 | Antkowiak et al. | |
| 5,525,639 A | 6/1996 | Keneko et al. | |
| 5,527,870 A | 6/1996 | Maeda et al. | |
| 5,530,052 A | 6/1996 | Takekoshi et al. | |
| 5,580,925 A | 12/1996 | Iwahara et al. | |
| 5,587,423 A | 12/1996 | Brandstetter et al. | |
| 5,594,072 A | 1/1997 | Handlin, Jr. et al. | |
| 5,614,579 A | 3/1997 | Roggeman et al. | |
| 5,627,252 A | 5/1997 | De La Croi Habimana | |
| 5,688,856 A | 11/1997 | Austgen, Jr. et al. | |
| 5,707,439 A | 1/1998 | Takekoshi et al. | |
| 5,728,791 A | 3/1998 | Tamai et al. | |
| 5,733,975 A | 3/1998 | Aoyama et al. | |
| 5,739,267 A | 4/1998 | Fujisawa et al. | |
| 5,742,118 A | 4/1998 | Endo et al. | |
| 5,763,551 A | 6/1998 | Wunsch et al. | |
| 5,773,521 A | 6/1998 | Hoxmeier et al. | |
| 5,777,037 A | 7/1998 | Yamanaka et al. | |
| 5,811,501 A | 9/1998 | Chiba et al. | |
| 5,834,563 A | 11/1998 | Kimura et al. | |
| 5,847,054 A | 12/1998 | McKee et al. | |
| 5,849,847 A | 12/1998 | Quirk | |
| 5,855,972 A | 1/1999 | Kaeding | |
| 5,883,173 A | 3/1999 | Elspass et al. | |
| 5,891,947 A | 4/1999 | Hall et al. | |
| 5,905,116 A | 5/1999 | Wang et al. | |
| 5,910,530 A | 6/1999 | Wang et al. | |
| 5,955,537 A | 9/1999 | Steininger et al. | |
| 5,986,010 A | 11/1999 | Clites et al. | |
| 5,994,468 A | 11/1999 | Wang et al. | |
| 6,011,116 A | 1/2000 | Aoyama et al. | |
| 6,020,446 A | 2/2000 | Okamoto et al. | |
| 6,025,416 A | 2/2000 | Proebster et al. | |
| 6,025,445 A | 2/2000 | Chiba et al. | |
| 6,060,549 A | 5/2000 | Li et al. | |
| 6,060,559 A | 5/2000 | Feng et al. | |
| 6,087,016 A | 7/2000 | Feeney et al. | |
| 6,087,456 A | 7/2000 | Sakaguchi et al. | |
| 6,106,953 A | 8/2000 | Zimmermann et al. | |
| 6,117,932 A | 9/2000 | Hasegawa et al. | |
| 6,121,379 A | 9/2000 | Yamanaka et al. | |
| 6,127,488 A | 10/2000 | Obrecht et al. | |
| 6,147,151 A | 11/2000 | Fukumoto et al. | |
| 6,180,693 B1 | 1/2001 | Tang et al. | |
| 6,191,217 B1 | 2/2001 | Wang et al. | |
| 6,197,849 B1 | 3/2001 | Zilg et al. | |
| 6,204,354 B1 | 3/2001 | Wang et al. | |
| 6,225,394 B1 | 5/2001 | Lan et al. | |
| 6,252,014 B1 | 6/2001 | Knauss | |
| 6,255,372 B1 | 7/2001 | Lin et al. | |
| 6,268,451 B1 | 7/2001 | Faust et al. | |
| 6,277,304 B1 | 8/2001 | Wei et al. | |
| 6,348,546 B2 | 2/2002 | Hiiro et al. | |
| 6,359,075 B1 | 3/2002 | Wollum et al. | |
| 6,379,791 B1 | 4/2002 | Cernohous et al. | |
| 6,383,500 B1 | 5/2002 | Wooley et al. | |
| 6,395,829 B1 | 5/2002 | Miyamoto et al. | |
| 6,420,486 B1 | 7/2002 | DePorter et al. | |
| 6,437,050 B1 | 8/2002 | Krom et al. | |
| 6,441,090 B1 | 8/2002 | Demirors et al. | |
| 6,448,353 B1 | 9/2002 | Nelson et al. | |
| 6,489,378 B1 | 12/2002 | Sosa et al. | |
| 6,524,595 B1 | 2/2003 | Perrier et al. | |
| 6,573,313 B2 | 6/2003 | Li et al. | |
| 6,573,330 B1 | 6/2003 | Fujikake et al. | |
| 6,598,645 B1 | 7/2003 | Larson | |
| 6,649,702 B1 | 11/2003 | Rapoport et al. | |
| 6,663,960 B1 | 12/2003 | Murakami et al. | |
| 6,689,469 B2 | 2/2004 | Wang et al. | |
| 6,693,746 B1 | 2/2004 | Nakamura et al. | |
| 6,706,813 B2 | 3/2004 | Chiba et al. | |
| 6,706,823 B2 | 3/2004 | Wang et al. | |
| 6,727,311 B2 | 4/2004 | Ajbani et al. | |
| 0,091,546 A1 | 5/2004 | Johnson et al. | |
| 6,737,486 B2 | 5/2004 | Wang | |
| 6,750,297 B2 | 6/2004 | Yeu et al. | |
| 6,759,464 B2 | 7/2004 | Ajbani et al. | |
| 6,774,185 B2 | 8/2004 | Lin et al. | |
| 6,777,500 B2 | 8/2004 | Lean et al. | |
| 6,780,937 B2 | 8/2004 | Castner | |
| 6,835,781 B2 | 12/2004 | Kondou et al. | |
| 6,858,665 B2 | 2/2005 | Larson | |
| 6,861,462 B2 | 3/2005 | Parker et al. | |
| 6,872,785 B2 | 3/2005 | Wang et al. | |
| 6,875,818 B2 | 4/2005 | Wang | |
| 6,908,958 B2 | 6/2005 | Maruyama et al. | |
| 0,228,072 A1 | 10/2005 | Winkler et al. | |
| 6,956,084 B2 | 10/2005 | Wang et al. | |
| 7,056,840 B2 | 6/2006 | Miller et al. | |
| 7,056,840 B2 | 6/2006 | Miller et al. | |
| 7,071,246 B2 | 7/2006 | Xie et al. | |
| 7,112,369 B2 | 9/2006 | Wang et al. | |
| 7,179,864 B2 | 2/2007 | Wang | |
| 7,193,004 B2 * | 3/2007 | Weydert et al. | 524/424 |
| 7,205,370 B2 | 4/2007 | Wang et al. | |
| 7,217,775 B2 | 5/2007 | Castner | |
| 7,238,751 B2 | 7/2007 | Wang et al. | |
| 7,244,783 B2 | 7/2007 | Lean et al. | |
| 7,291,394 B2 | 11/2007 | Winkler et al. | |
| 7,347,237 B2 | 3/2008 | Xie et al. | |
| 7,408,005 B2 | 8/2008 | Zheng et al. | |
| 0,048,390 A1 | 2/2009 | Wang et al. | |
| 2001/0053813 A1 | 12/2001 | Konno et al. | |
| 2002/0007011 A1 | 1/2002 | Konno et al. | |
| 2002/0045714 A1 | 4/2002 | Tomalia et al. | |
| 2002/0095008 A1 | 7/2002 | Heimrich et al. | |
| 2002/0144401 A1 | 10/2002 | Nogueroles Vines et al. | |
| 2003/0004250 A1 | 1/2003 | Ajbani et al. | |
| 2003/0032710 A1 | 2/2003 | Larson | |
| 2003/0124353 A1 | 7/2003 | Wang et al. | |
| 2003/0130401 A1 | 7/2003 | Lin et al. | |
| 2003/0149185 A1 | 8/2003 | Wang et al. | |
| 2003/0198810 A1 * | 10/2003 | Wang et al. | 428/401 |
| 2003/0225190 A1 | 12/2003 | Borbely et al. | |
| 2004/0033345 A1 | 2/2004 | Dubertret et al. | |
| 2004/0059057 A1 | 3/2004 | Swisher et al. | |
| 2004/0127603 A1 | 7/2004 | Lean et al. | |
| 2004/0143064 A1 | 7/2004 | Wang | |
| 2004/0198917 A1 | 10/2004 | Castner | |
| 2005/0101743 A1 | 5/2005 | Stacy et al. | |
| 2005/0182158 A1 | 8/2005 | Ziser et al. | |
| 2005/0192408 A1 | 9/2005 | Lin et al. | |
| 2005/0197462 A1 | 9/2005 | Wang et al. | |
| 2005/0203248 A1 | 9/2005 | Zheng et al. | |
| 2005/0215693 A1 | 9/2005 | Wang et al. | |
| 2005/0228074 A1 | 10/2005 | Wang et al. | |
| 2005/0282956 A1 | 12/2005 | Bohm et al. | |
| 2006/0084722 A1 | 4/2006 | Lin et al. | |
| 2006/0173115 A1 | 8/2006 | Wang et al. | |
| 2006/0173130 A1 | 8/2006 | Wang et al. | |
| 2006/0235128 A1 | 10/2006 | Bohm et al. | |
| 2007/0135579 A1 | 6/2007 | Obrecht et al. | |
| 2007/0142550 A1 | 6/2007 | Wang et al. | |
| 2007/0142559 A1 | 6/2007 | Wang et al. | |
| 2007/0149649 A1 | 6/2007 | Wang et al. | |
| 2007/0161754 A1 | 7/2007 | Wang et al. | |
| 2007/0185273 A1 | 8/2007 | Wang et al. | |
| 2007/0196653 A1 | 8/2007 | Hall et al. | |
| 2008/0145660 A1 | 6/2008 | Wang et al. | |

| | | | |
|---|---|---|---|
| 2008/0149238 | A1 | 6/2008 | Kleckner et al. |
| 2008/0160305 | A1 | 7/2008 | Warren et al. |
| 2008/0286374 | A1 | 11/2008 | Wang et al. |
| 2008/0305336 | A1 | 12/2008 | Wang et al. |
| 2009/0005491 | A1 | 1/2009 | Warren et al. |
| 2009/0048390 | A1 | 2/2009 | Wang et al. |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 6/2002 |
| EP | 1321489 | 6/2003 |
| EP | 1783168 | 5/2007 |
| FR | 2099645 | 3/1972 |
| JP | 01279943 | 11/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 98/53000 | 11/1998 |
| WO | 00/75226 | 12/2000 |
| WO | 01/87999 | 11/2001 |
| WO | 02/31002 | 4/2002 |
| WO | 02/081233 | 10/2002 |
| WO | 02/100936 | 12/2002 |
| WO | 03/032061 | 4/2003 |
| WO | 03085040 | 10/2003 |
| WO | 2004/058874 | 7/2004 |
| WO | 2006/069793 | 7/2006 |
| WO | 2008/079276 | 7/2008 |
| WO | 2008/079807 | 7/2008 |
| WO | 2009/006434 | 1/2009 |

OTHER PUBLICATIONS

Ishizu, Koji et al., "Preparation of core-shell type polymer microspheres from anionic block copolymers", Polymer, vol. 34, No. 18, pp. 3929-3933 (1993).
O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].
Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).
Saito, Reiko et al., "Arm-number effect of core-shell type polymer microsphere: 1. Control of arm-number of microsphere", Polymer, vol. 35, No. 4, pp. 866-871 (1994).
International Search Report dated May 27, 2008 from corresponding PCT Application No. PCT/US2007/087869 [4 PP.].
Kralik, M. et al., "Catalysis by metal nanoparticles supported on functional organic polymers", Journal of Molecular Catalysis A: Chemical, vol. 177, pp. 113-138 [2001].
Wang, Xiaorong et al., U.S. Appl. No. 10/791,049, filed Mar. 2, 2004 entitled "Method Of Making Nano-Particles of Selected Size Distribution".
Wang, Xiaorong et al., U.S. Appl. No. 10/791,177, filed Mar. 2, 2004 entitled "Rubber Composition Containing Functionalized Polymer Nanoparticles".
Wang, Xiaorong et al., U.S. Appl. No. 10/872,731, filed Jun. 21, 2004 entitled "Reversible Polymer/Metal Nano-Composites And Method For Manufacturing Same".
Wang, Xiaorong et al., U.S. Appl. No. 10/886,283, filed Jul. 6, 2004 entitled "Hydropobic Surfaces with Nanoparticles".
Wang, Xiaorong et al., U.S. Appl. No. 11/058,156, filed Feb. 15, 2005 entitled "Multi-Layer Nano-Particle Preparation And Applications".
Wang, Xiaorong et al., U.S. Appl. No. 11/104,759, filed Apr. 13, 2005 entitled "Nano-Particle Preparation And Applications".
Bohm, Georg G.A. et al., U.S. Appl. No. 11/117,981, filed Apr. 29, 2005 entitled "Self Assembly Of Molecules To Form Nano-Particle".
Wang, Xiaorong et al., U.S. Appl. No. 11/305,279, filed Dec. 16, 2005 entitled "Combined Use Of Liquid Polymer And Polymeric Nanoparticles For Rubber Applications".
Wang, Xiaorong et al., U.S. Appl. No. 11/344,861, filed Feb. 1, 2006 entitled "Nano-Composite And Compositions Therefrom".
Wang, Xiaorong et al., U.S. Appl. No. 11/642,796, filed Dec. 20, 2006 entitled "Hollow Nano-Particles And Method Thereof".
Wang, Xiaorong et al., U.S. Appl. No. 11/764,607, filed Jun. 18, 2007 entitled "Multi-Layer Nano-Particle Preparation and Applications".
Warren, Sandra, U.S. Appl. No. 11/771,659, filed Jun. 29, 2007 entitled "One-Pot Synthesis Of Nanoparticles And Liquid Polymer For Rubber Applications".
Wang, Xiaorong et al., U.S. Appl. No. 11/941,128, filed Nov. 16, 2007 entitled "Nano-Particle Preparation And Applications".
Wang, Xiaorong et al., U.S. Appl. No. 11/954,268, filed Dec. 12, 2007 entitled "Nanoporous Polymeric Material And Preparation Method".
Wang, Xiaorong et al., U.S. Appl. No. 12/047,896, filed Mar. 13, 2008 entitled "Reversible Polymer/Metal Nano-Composites And Method For Manufacturing Same".
Wang, Xiaorong et al., U.S. Appl. No. 12/184,895, filed Aug. 1, 2008 entitled "Disk-Like Nanoparticles".
Cui, Honggang et al., "Block Copolymer Assembly via Kinetic Control", Science, vol. 317, pp. 647-650 (Aug. 3, 2007).
Wang, Xiaorong et al., "Synthesis, Characterization, and Application of Novel Polymeric Nanoparticles", Macromolecules, 40, pp. 499-508 (2007).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Heterogeneity of structural relaxation in a particle-suspension system", EPL, 79, 18001, pp. 1-5 (Jul. 2007).
Sakurai, Ryo et al., "68.2: Color and Flexible Electronic Paper Display using QR-LPD Technology", SID 06 Digest, pp. 1922-1925 (2006).
Asinovsky, Olga, Jun. 20, 2006 Office Action from U.S. Appl. No. 10/791,049, filed Mar. 2, 2004 (11 pp.).
Asinovsky, Olga, Dec. 22, 2006 Office Action from U.S. Appl. No. 10/791,049, filed Mar. 2, 2004 (11 pp.).
Asinovsky, Olga, Jun. 7, 2007 Office Action from U.S. Appl. No. 10/791,049, filed Mar. 2, 2004 (11 pp.).
Asinovsky, Olga, Nov. 28, 2007 Office Action from U.S. Appl. No. 10/791,049, filed Mar. 2, 2004 (9 pp.).
Asinovsky, Olga, May 21, 2008 Office Action from U.S. Appl. No. 10/791,049, filed Mar. 2, 2004 (11 pp.).
Asinovsky, Olga, Sep. 11, 2008 Office Action from U.S. Appl. No. 10/791,049, filed Mar. 2, 2004 (12 pp.).
Ronesi, Vickey M., Jan. 8, 2007 Office Action from U.S. Appl. No. 10/791,177, filed Mar. 2, 2004 (5 pp.).
Harlan, Robert D., May 3, 2007 Office Action from U.S. Appl. No. 10/791,177, filed Mar. 2, 2004 (6 pp.).
Harlan, Robert D., Oct. 18, 2007 Office Action from U.S. Appl. No. 10/791,177, filed Mar. 2, 2004 (6 pp.).
Harlan, Robert D., May 28, 2008 Office Action from U.S. Appl. No. 10/791,177, filed Mar. 2, 2004 (8 pp.).

Kiliman, Leszek B., Sep. 9, 2005 Office Action from U.S. Appl. No. 10/817,995, filed Apr. 5, 2004 (7 pp.).
Kiliman, Leszek B., Mar. 23, 2006 Office Action from U.S. Appl. No. 10/817,995, filed Apr 5, 2004 (7 pp.).
Kiliman, Leszek B., Dec. 13, 2006 Office Action from U.S. Appl. No. 10/817,995, filed Apr. 5, 2004 (6 pp.).
Kiliman, Leszek B., Sep. 5, 2008 Office Action from U.S. Appl. No. 10/817,995, filed Apr. 5, 2004 (5 pp.).
Wyrozebski Lee, Katarzyna I., Dec. 19, 2006 Office Action from U.S. Appl. No. 10/872,731, filed Jun. 21, 2004 (6 pp.).
Wyrozebski Lee, Katarzyna I., Mar. 7, 2007 Office Action from U.S. Appl. No. 10/872,731, filed Jun. 21, 2004 (13 pp.).
Wyrozebski Lee, Katarzyna I., Sep. 14, 2007 Office Action from U.S. Appl. No. 10/872,731, filed Jun. 21, 2004 (9 pp.).
Chevalier, Alicia Ann, Sep. 6, 2006 Office Action from U.S. Appl. No. 10/886,283, filed Jul. 6, 2004 (5 pp.).
Chevalier, Alicia Ann, Jan. 4, 2007 Office Action from U.S. Appl. No. 10/886,283, filed Jul. 6, 2004 (8 pp.).
Chevalier, Alicia Ann, Jul. 2, 2007 Office Action from U.S. Appl. No. 10/886,283, filed Jul. 6, 2004 (8 pp.).
Chevalier, Alicia Ann, Jan. 4, 2008 Office Action from U.S. Appl. No. 10/886,283, filed Jul. 6, 2004 (8 pp.).
Mullis, Jeffrey C., Oct. 31, 2006 Office Action from U.S. Appl. No. 11/050,115, filed Feb. 3, 2005 (6 pp.).
Mullis, Jeffrey C., Mar. 24, 2008 Office Action from U.S. Appl. No. 11/050,115, filed Feb. 3, 2005 (10 pp.).
Mullis, Jeffrey C., Aug. 21, 2008 Office Action from U.S. Appl. No. 11/050,115, filed Feb. 3, 2005 (7 pp.).
Lipman, Bernard., Sep. 29, 2006 Office Action from U.S. Appl. No. 11/058,156, filed Feb. 15, 2005 (5 pp.).
Harlan, Robert D., Final Office Action dated Dec. 10, 2008 from U.S. Appl. No. 10/791,177 (8 pp.).
Mulcahy, Peter D., Restriction/Election Office Action dated Dec. 11, 2008 from U.S. Appl. No. 11/642,802 (7 pp.).
Lipman, Bernard, Notice of Allowance dated Jan. 14, 2009 from U.S. Appl. No. 11/058,156 (5 pp.).
Harlan, Robert D., Office Action dated Jan. 9, 2009 from U.S. Appl. No. 11/117,981 (6 pp.).
Cain, Edward J., Notice of Allowance dated Dec. 31, 2008 from U.S. Appl. No. 11/642,124 (5 pp.).
Lipman, Bernard, Mar. 26, 2002 Notice of Allowance from U.S. Appl. No. 09/970,830, filed Oct. 4, 2001 (4 pp.).
Kiliman, Leszek B., Feb. 13, 2003 Office from U.S. Appl. No. 10/038,748, filed Dec. 31, 2001 (3 pp.).
Kiliman, Leszak B., Aug. 25, 2003 Notice of Allowance from U.S. Appl. No. 10/038,748, filed Dec. 31, 2001 (5 pp.).
Harlan, Robert D., Mar. 17, 2004 Restriction/Election Office Action from U.S. Appl. No. 10/223,393, filed Aug. 19, 2002 (6 pp.).
Harlan, Robert D., Jun. 22, 2004 Office Action from U.S. Appl. No. 10/223,393, filed Aug. 19, 2002 (6 pp.).
Harlan, Robert D., Jan. 3, 2005 Notice of Allowance from U.S. Appl. No. 10/223,393, filed Aug. 19, 2002 (6 pp.).
Lipman, Bernard, Mar. 25, 2004 Restriction/Election Office Action from U.S. Appl. No. 10/331,841, filed Dec. 30, 2002 (6 pp.).
Lipman, Bernard, Nov. 18, 2004 Notice of Allowance from U.S. Appl. No. 10/331,841, filed Dec. 30, 2002 (5 pp.).
Lipman, Bernard, Mar. 24, 2004 Restriction/Election Office Action from U.S. Appl. No. 10/345,498, filed Jan. 16, 2003 (5 pp.).
Lipman, Bernard, Nov. 23, 2004 Notice of Allowance from U.S. Appl. No. 10/345,498, filed Jan. 16, 2003 (5 pp.).
Choi, Ling Siu, Mar. 24, 2006 Office Action from U.S. Appl. No. 10/755,648, filed Jan. 12, 2004 (11 pp.).
Choi, Ling Siu, Dec. 4, 2006 Notice of Allowance from U.S. Appl. No. 10/755,648, filed Jan. 12, 2004 (9 pp.).
Asinovsky, Olga, Aug. 16, 2007 Advisory Action from U.S. Appl. No. 10/791,049, filed Mar. 2, 2004 (2 pp.).
Asinovsky, Olga, Jul. 29, 2008 Advisory Action from U.S. Appl. No. 10/791,049, filed Mar. 2, 2004 (3 pp.).
Harlan, Robert D., Jan. 9, 2008 Advisory Action from U.S. Appl. No. 10/791,177, filed Mar. 2, 2004 (3 pp.).
Harlan, Robert D., Mar. 7, 2008 Advisory Action from U.S. Appl. No. 10/791,177, filed Mar. 2, 2004 (3 pp.).

Le, Hoa T., Dec. 14, 2004 Office Action from U.S. Appl. No. 10/791,491, filed Mar. 2, 2004 (5 pp.).
Le, Hoa T., Jul. 5, 2005 Office Action from U.S. Appl. No. 10/791,491, filed Mar. 2, 2004 (9 pp.).
Le, Hoa T., Apr. 10, 2006 Notice of Allowance from U.S. Appl. No. 10/791,491, filed Mar. 2, 2004 (5 pp.).
Kiliman, Leszak B., May 15, 2007 Advisory Action from U.S. Appl. No. 10/817,995, filed Apr. 5, 2004 (2 pp.).
Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action from U.S. Appl. No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 International Search Report from PCT Patent Application No. PCT/US2004/001000 filed Jan. 15, 2004 (3 pp.).
Russell, G., Aug. 1, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/026031 filed Dec. 19, 2007 (3 pp.).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use for Solubilization Metal Salts and Metal Colloids", Macromolecules, 29, pp. 3800-3806 (1996).

Bahadur, Pratap, "Block copolymers- Their microdomain formation (in solid state) and surfactant behaviour (in solution)", Current Science, vol. 80, No. 8, pp. 1002-1007, Apr. 25, 2001.

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 2006 (4 pp.).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday I, 76, pp. 1857-1867 (1980).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Chen, Wei et al., "Ultrahydrophobic and Ultralyophobic Surfaces: Some Comments and Examples", The ACS Journal of Surfaces and Colloids, vol. 15, No. 10, pp. 3395-3399 (May 11, 1999).

Coleman, Lester E. et al., "Reaction of Primary Aliphatic Amines with Maleic Anhydride", J. Org,. Chem., 24, 185, pp. 135-136 (1959).

Cosgrove, T . et al., Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Dieterich, W. et al., "Non-Debye Relaxations in Disordered Ionic Solids", Chem. Chys., 284, pp. 439-467 (2002).

Edmonds, William F. et al., "Disk Micelles from Nonionic Coil- Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay; C., "Wetting of a Polymer Brush by a Chemically Identical Polymer Melt", Macromolecules, vol. 30, pp. 5939-5943 (1997).

Gilman, J.W. et al., "Recent Advances in Flame Retardant Polymer Nanocomposites", pp. 273-283.

Giannelis, E.P. "Polymer Layered Silicate Nanocomposites", Advanced Materials, vol. 8, No. 1, pp. 29-35 (Jan. 1, 1996).

Greenwood, N.N. et al., "Chemistry of the Elements", Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493, Jan. 17, 1996.

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymer Melts", Macromolecules, vol. 29, pp. 6656-6662 (1996).

Hay, J.N. et al., "A Review of Nanocomposites" (2000).

Hoffman, B. et al., "Rheology of Nanocomposites Based on Layered Silicates and Polyamide-12", Colloid Polm. Sci.., 278, pp. 629-636 (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

Ishizu, Koji, "Star Polymers by Immobilizing Functional Block Copolymers", Star and Hyperbranched Polymers, ISBN 0-8247, pp. 1986-1987 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, R. et al., "Rheology of End-Tethered Polymer Layered Silicate Nanocomposites", Macromol., 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mandema et al., "Association of Block Copolymers in Selective Solvents, 1 Measurements on Hydrogenated Poly(styrene-isoprene) in Decane and in trans-Decalin", Makromol. Chem. 180, pp. 1521-1538 (1979).

Matsen, M.W., "Phase Behavior of Block Copolymer/Homopolymer Blends", Macromolecules, vol. 28, pp. 5765-5773 (1995).

Matsumoto, A. et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, M. et al., Macromol. Symp., 117, pp. 207-218 (1997).

Mossmer, S. et al., Macromol. 33, pp. 4791-4798 (2000).

Nace, Vaughn M., "Nonionic Surfactants: Polyoxyalkylene Block Copolymers", Surfactant Science Series, vol. 60, pp. 1-266 (1996).

Newkome G.R, "Dendrimers and Dendrons, Concept, Synthesis, Application", pp. 45, 191-310 (2001).

Noolandi, Jaan et al., "Theory of Block Copolymer Micelles in Solution", Macromolecules, vol. 16, pp. 1443-1448 (1983).

O'Reilly, Rachel K. et al., "Cross-linked block copolymer micelles: functional nanostructures of great potential and versatility", Chem. Soc. Rev., vol. 35, pp. 1068-1083 (Oct. 2, 2006).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696, 1985.

Piirma, Irja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Price, Colin, "Colloidal Properties of Block Copolymers", Applied Science Publishers Ltd., Chapter 2, pp. 39-80 (1982).

Quirk, R.P. et al., Macromolecules, 34, pp. 1192-1197 (2001).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Ren, J., "Linear Viscoelasticity of Disordered Polystyrene-Polysioprene . . . Layered-Silicate Nanocomposites", Macromol., pp. 3739-3746 (2000).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170 (Jan. 16, 2003).

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).

Saito, Reiko et al., "Synthesis of Microspheres with Microphase-Separated Shells", Journal of Polymer Science: Part A: Polymer Chemistry, vol. 38, pp. 2091-2097 (2000).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54 (1999).

Tiyapiboonchaiya, C. et la., "Polymer-m-Ionic-Liqid Electrolytes", Micromol. Chem. Phys., 203, pp. 1906-1911 (2002).

Tomalia, Donald A. et al., Dendritic Macromolecules: Synthesis of Starburst Dendrimers, , Macromolecules, vol. 19, No. 9, pp. 2466-2468 (1986).

Tsitsilianis, Constantinos et al., Makromol. Chem. 191, pp. 2319-2328 (1990).

Tuzar et al ., "Anomalous Behaviour of Solutions of Styrene-Butadiene Block Copolymers in Some Solvents", Makromol. Chem. 178, pp. 22743-2746, (1977).

Tuzar, Zdenek et al., "Micelles of Block and Graft Copolymers in Solutions", Surface and Colloid Science, vol. 15, Chapter 1, pp. 1-83 (1993).

Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Webber, Stephen E. et al., "Solvents and Self-Organization of Polymers", NATO ASI Series, Series E: Applied Sciences, vol. 327, pp. 1-509 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).

Wilson, D.J. et al., "Photochemical Stabilization of Block Copolymer Micelles", Eur. Polym. J., vol. 24, No. 7, pp. 617-621, 1988.

Witten, T.A. et al., "Stress Relaxation in the Lamellar Copolymer Mesophase", Macromolecules, vol. 23, pp. 824-829 (1990).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Bridgestone Americas 2006 Presentation (14 pp.).

"Quaternary Ammonium Compounds", Encyclopedia of Chem Tech., 4th Ed., vol. 20, pp. 739-767 (1996).

"Simultaneous TA and MS Analysis of Alternating Styrene-Malei Anhydride and Styrene-Maleimide Copolymers", Thermochim. Acta, 277, 14 (1996).

Vulcanization Agents and Auxiliary Materials, Kirk-Othmer, Encyclopedia of Chemical Technology, 3rd Ed., Wiley Interscience, NY, 1982, vol. 22, pp. 390-403.

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Lipman, Bernard, Notice of Allowance dated Jan. 27, 2009 from U.S. Appl. No. 11/764,607 (4 pp.).

Johnson, Edward M., International Search Report dated Dec. 12, 2008 from PCT Application No. PCT/US07/74611 (5 pp.).

Wang, Xiaorong et al., U.S. Appl. No. 12/374,883 international filing date Jul 27, 2007, entitled "Polymeric Core-Shell Nanoparticles with Interphase Region".

Peets, Monique R., May 11, 2009 Restriction/Election Office Action from U.S. Appl. No. 11/697,801(6 pp.).

Mullis, Jeffrey C., May 19, 2009 Advisory Action from U.S. Appl. No. 10/791,049(5 pp.).

Zemel, IrMa Sopja, Office Action dated May 28, 2009 from U.S. Appl. No. 11/305,279 (7 pp.).

Mullis, Jeffrey C., Jul. 15, 2009 Advisory Action from U.S. Appl. No. 11/641,514 (4 pp.).

Peels, Monique R., Jul. 20, 2009 Office Action from U.S. Appl. No. 11/697,801(9 pp.).

Lipman, Bernard, Notice of Allowance dated Jan. 27, 2009 from U.S. Appl. No. 11/764,607 (4 pp.).

Johnson, Edward M., International Search Report dated Dec. 12, 2008 from PCT Application No. PCl/US07/7461 I (5 pp.).

Wang, Xiaorong et al U.S. Appl. No. 12/374883 international filing date Jul. 27, 2007, entitled "Polymeric Core-Shell Nanoparticles with Interphase Region".

Pak, Hannah J., Apr. 2, 2009 Office Action from U.S. Appl. No. 11/941,128 (9 pp.).

Harlan, Robert D., Apr. 30, 2009 Office Action from U.S. Appl. No. 11/117,981(7 pp.).

Mullis, Jeffrey C., Apr. 30, 2009 Final Office Action from U.S. Appl. No. 11/641,514 (11 pp.).

Mulcahy, Peter D., May 13, 2009 Office Action from U.S. Appl. No. 11/642,802 (7 pp.).

Wang, Xiaorong et al., "Dispersing hairy nanoparticles in polymer melts", Polmer, Vol. 49, pp. 5683-5691 (Nov. 1, 2008).

* cited by examiner

RUBBER COMPOSITION CONTAINING A POLYMER NANOPARTICLE

FIELD OF DISCLOSURE

The disclosure provides a rubber composition incorporating nanoparticles comprising a core and a surface layer, wherein the surface layer comprises a poly(mono-vinyl aromatic-conjugated diene) and the core has a glass transition temperature (Tg) between about 150° C. and about 600° C.

BACKGROUND

On occasion, there is an increasing interest to provide tires with a high level of handling, i.e. steering response, a high level of grip, and low fuel consumption. A common method of increasing the steering response of the tire is to use a tread rubber with high stiffness. High stiffness compounds typically have a high dynamic storage modulus. Conventional compounding techniques used to increase the dynamic storage modulus include using a high filler loading, using a filler with a high surface area, using less softener, and using styrene-butadiene polymers with a high styrene content. However, each of these conventional methods has performance tradeoffs.

For example, the above mentioned conventional techniques can increase the hysteresis of the rubber compound. Increasing the hysteresis of the rubber results in more energy lost as heat, and thus increases fuel consumption.

In addition, increasing the filler loading, using a filler with a high surface area, and lowering the softener level can have a negative effect on processing, as they all increase the time it takes to disperse the filler into the rubber.

Therefore, a need remains to improve the dynamic modulus of a rubber compound without significantly impacting compound hysteresis or compound processing.

SUMMARY OF THE INVENTION

Provided is a composition comprising a rubber and a polymer nano-particle comprising a poly(mono-vinyl aromatic) core and a poly(mono-vinyl aromatic-conjugated diene) surface layer, wherein the core of the polymeric nano-particle has a glass transition temperature (Tg) of between about 150° C. and about 600° C.

Also provided is a composition comprising at least two (mono-vinyl aromatic-conjugated diene) copolymer rubbers and a polymeric nano-particle comprising a poly(mono-vinyl aromatic) core and a poly(mono-vinyl aromatic-conjugated diene) surface layer; wherein the core of the polymeric nano-particle has a glass transition temperature (Tg) of between about 150° C. and about 600° C., and the poly(mono-vinyl aromatic-conjugated diene) surface layer of the polymeric nano-particle comprises a mono-vinyl aromatic content that is between about 50 percent and about 150 percent that of the mono-vinyl content of one of the (mono-vinyl aromatic-conjugated diene) copolymer rubbers.

Additionally, a tire comprising a tread is provided. The tread comprises a rubber and a polymer nano-particle comprising a poly(mono-vinyl aromatic) core and a poly(mono-vinyl aromatic-conjugated diene) surface layer, wherein the core of the polymeric nano-particle has a glass transition temperature (Tg) of between about 150° C. and about 600° C.

DETAILED DESCRIPTION

Figure 1:
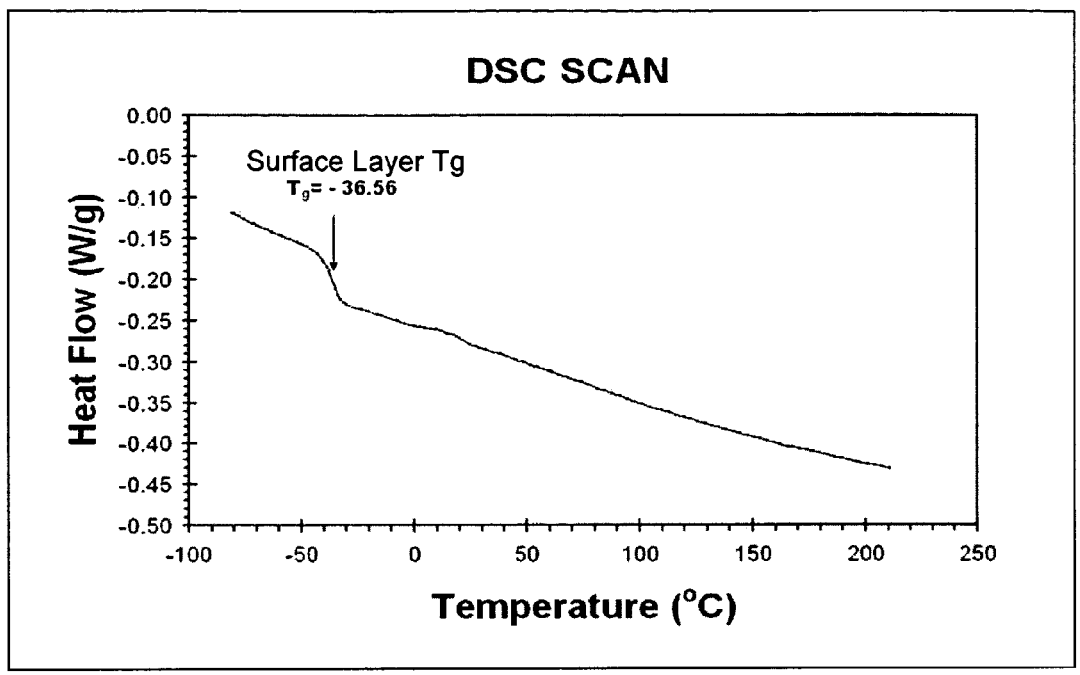
FIG. 1 is a graphical depiction of Differential Scanning Calorimetry analysis of the nano-particles utilized in example 1.

Polymer nanoparticles with a surface layer and a core with a Tg between about 150° C. and about 600° C. may be prepared by:
  (i) in a liquid hydrocarbon medium, polymerizing conjugated diene monomers to produce a poly(conjugated diene) block; and
  (ii) copolymerizing the poly(conjugated diene) block with a mixture of mono-vinyl aromatic monomers and multiple-vinyl aromatic monomers to produce an aromatic block.

Prior patents and publications such as U.S. Pat. No. 6,437,050 (Bridgestone Corp.) and Macromol. Symp. 118, 143-148 (1997) are incorporated herein as general references.

While step (ii) takes place, a sufficient amount of the copolymers comprising the poly(conjugated diene) block and the aromatic block may assemble to form micelle structures, and typically in the meanwhile, the aromatic blocks may be crosslinked by the multiple-vinyl aromatic monomers.

The polymer nanoparticles with a surface layer and a core with a Tg between about 150° C. and about 600° C. are formed through dispersion polymerization, although emulsion polymerization may also be contemplated. The polymerization may be accomplished by a multi-stage anionic polymerization. Multi-stage anionic polymerizations have been conducted to prepare block-copolymers, for example in U.S. Pat. No. 4,386,125, which is incorporated herein by reference. Other relevant references include U.S. Pat. No. 6,437,050 and U.S. patent application 2004/0143064.

The polymer nanoparticles can be formed from di-block copolymer chains comprising the poly(conjugated diene) block and the aromatic block. The aromatic blocks are typically crosslinked due to the presence of multiple-vinyl aromatic monomers, at least partially giving a way of controlling the core Tg. The polymer nanoparticles preferably retain their discrete nature with little or no polymerization between each other. In preferred embodiments, the nanoparticles are substantially monodisperse and uniform in shape.

The liquid hydrocarbon medium functions as the dispersion solvent, and may be selected from any suitable aliphatic hydrocarbons, alicyclic hydrocarbons, or mixtures thereof, with a proviso that it exists in liquid state during the nanoparticles' formation procedure. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cyclopentane, cycloheptane, cyclooctane, cyclononane, cyclodecane, and the like. Generally, aromatic hydrocarbons and polar solvents are not preferred as the liquid medium. In exemplified embodiments, the liquid hydrocarbon medium comprises hexane.

Any suitable conjugated diene or mixture thereof may be used as the monomer(s) to produce the poly(conjugated diene) block. Specific examples of the conjugated diene monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixture thereof is used as the conjugated diene monomer.

The polymerizing of conjugated diene monomers into a poly(conjugated diene) block is initiated via addition of anionic initiators that are known in the art. For example, the anionic initiator can be selected from any known organolithium compounds. Suitable organolithium compounds are represented by the formula as shown below:

$$R(Li)_x$$

wherein R is a hydrocarbyl group having 1 to x valence(s). R generally contains 1 to 20, preferably 2-8, carbon atoms per R group, and x is an integer of 1-4. Typically, x is 1, and the R group includes aliphatic radicals and cycloaliphatic radicals, such as alkyl, cycloalkyl, cycloalkylalkyl, alkylcycloalkyl, alkenyl, as well as aryl and alkylaryl radicals.

Specific examples of R groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Other lithium initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like. Preferred lithium initiators include n-butyllithium, sec-butyllithium, tert-butyllithium, 1,4-dilithiobutane, and mixtures thereof.

Other lithium initiators which can be employed are lithium dialkyl amines, lithium dialkyl phosphines, lithium alkyl aryl phosphines and lithium diaryl phosphines. Functionalized lithium initiators may also be utilized. Preferred functional groups include amines, formyl, carboxylic acids, alcohol, tin, silicon, silyl ether and mixtures thereof.

In certain embodiments, n-butyllithium, sec-butyllithium, tert-butyllithium, or mixture thereof are used to initiate the polymerization of the conjugated diene monomers into a poly(conjugated diene) block.

The polymerization of conjugated diene monomers into a poly(conjugated diene) block may last as long as necessary until the desired monomer conversion, degree of polymerization (DP), and block molecular weight are obtained. The polymerization reaction of this step may last from about 0.25 hours to about 10 hours, or from about 0.5 hours to about 4 hours, or from about 0.5 hours to about 2 hours. The polymerization reaction of this step may be conducted at a temperature of from about 70° F. to about 350° F., or from about 74° F. to about 250° F., or from about 80° F. to about 200° F. In exemplified embodiments, the polymerization lasts about 90 minutes at 65-195° F.

The anionic polymerization of conjugated diene monomers may be conducted in the presence of a modifier or a 1,2-microstructure controlling agent, so as to, for example, increase the reaction rate, equalize the reactivity ratio of monomers, and/or control the 1,2-microstructure in the conjugated diene monomers. Suitable modifiers include, but are not limited to, triethylamine, tri-n-butylamine, hexamethylphosphoric acid triamide, N, N, N', N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, and the like.

The anionic polymerization can also be conducted in the presence of an amine compound such as triethyl amine, trimethyl amine, tripropyl amine, tri-isopropyl amine, tri-n-butyl amine, and the like, and the mixture thereof.

Other modifiers or 1,2-microstructure controlling agents may be linear oxolanyl oligomers represented by the structural formula (IV) and cyclic oligomers represented by the structural formula (V), as shown below:

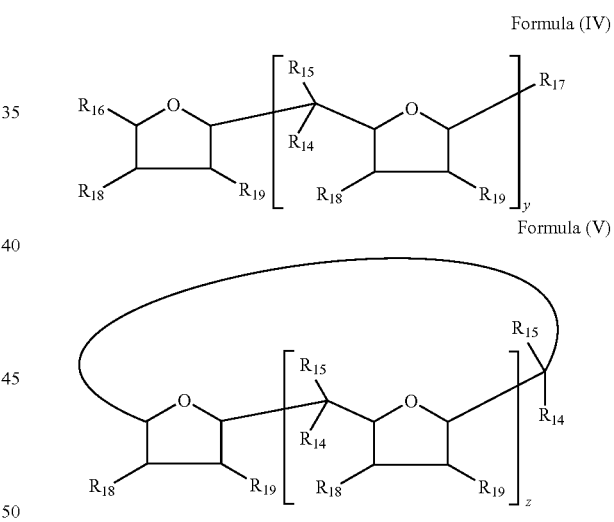

Formula (IV)

Formula (V)

wherein $R_{14}$ and $R_{15}$ are independently hydrogen or a $C_1$-$C_8$ alkyl group; $R_{16}$, $R_{17}$, $R_{18}$, and $R_{19}$ are independently hydrogen or a $C_1$-$C_6$ alkyl group; y is an integer of 1 to 5 inclusive, and z is an integer of 3 to 5 inclusive.

Specific examples of modifiers or 1,2-microstructure controlling agents include, but are not limited to, oligomeric oxolanyl propanes (OOPs); 2,2-bis-(4-methyl dioxane); bis (2-oxolanyl) methane; 1,1-bis(2-oxolanyl) ethane; bistetrahydrofuryl propane; 2,2-bis(2-oxolanyl) propane; 2,2-bis(5-methyl-2-oxolanyl) propane; 2,2-bis-(3,4,5-trimethyl-2-oxolanyl) propane; 2,5-bis(2-oxolanyl-2-propyl) oxolane; octamethylperhydrocyclotetrafurfurylene (cyclic tetramer); 2,2-bis(2-oxolanyl) butane; and the like. A mixture of two or more modifiers or 1,2-microstructure controlling agents also can be used.

Optionally, the poly(conjugated diene) block has a randomized structure comprising conjugated diene monomers and mono-vinyl aromatic monomers that are copolymerized using an anionic initiator, optionally in the presence of a modifier. Suitable mono-vinyl aromatic monomers include, but are not limited to, styrene, ethylvinylbenzene, α-methylstyrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 18; and mixtures thereof. In exemplified embodiments, the mono-vinyl aromatic monomer comprises styrene or ethylvinylbenzene or mixture thereof. If the poly(conjugated diene) block has a randomized structure comprising conjugated diene monomers and mono-vinyl aromatic monomers, the resulting polymer nanoparticle will have a surface layer. having a copolymer comprising conjugated diene units and mono-vinyl aromatic units.

A mixture of mono-vinyl aromatic monomers and multiple-vinyl aromatic monomers may then be copolymerized with the living poly(conjugated diene) block. The weight ratio between the mono-vinyl aromatic monomers and multiple-vinyl aromatic monomers may broadly range from about 99.9:0.01 to about 0.01:99.9, preferably from about 99:1 to about 1:99, and more preferably from about 90:10 to about 10:99.

Any compound that comprises one vinyl group and an aromatic group may be used as the mono-vinyl aromatic monomer. Suitable mono-vinyl aromatic monomers include, but are not limited to styrene, ethylvinylbenzene, α-methylstyrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 18; and mixtures thereof. In exemplified embodiments, the mono-vinyl aromatic monomer comprises styrene or ethylvinylbenzene or mixture thereof.

Any compound that comprises two or more vinyl groups and an aromatic group may be used as the multiple-vinyl aromatic monomer. Suitable multiple-vinyl aromatic monomers include, but are not limited to compounds with a general formula as shown below:

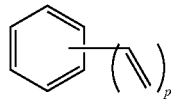

in which p is an integer and $2 \leq p \leq 6$, preferably, p is 2 or 3, more preferably p is 2, i.e. di-vinyl-benzene (DVB).

In one embodiment, the DVB may be selected from any one of the following isomers or any combination thereof:

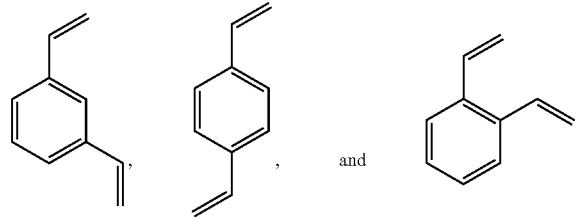

Additional anionic initiator such as lithium initiator may be added when the mixture of mono-vinyl aromatic monomers and multiple-vinyl aromatic monomers is copolymerized with the living poly(conjugated diene) block. Exemplary anionic initiators may be those described above. In preferred embodiments, n-butyllithium, sec-butyllithium, tert-butyllithium, or mixture thereof are used. The polymerization may last as long as necessary until the desired core Tg, monomer conversion, degree of polymerization (DP), and block molecular weight are obtained. The polymerization reaction of this step may last from about 0.5 hours to about 10 hours, or from about 1 hour to about 6 hours, or from about 1 hour to about 4 hours. The polymerization reaction of this step may be conducted at a temperature of from about 70° F. to about 350° F., or from about 74° F. to about 250° F., or form about 80° F. to about 200° F. In exemplified embodiments, the polymerization step lasts 3 hours at 165° F. and then 1 hour at 210° F.

It should be understood that, due to a mixture of mono-vinyl aromatic monomers and multiple-vinyl aromatic monomers being used, micelle assembly and crosslinking of the aromatic blocks may take place simultaneously.

The polymer nanoparticles are formed from the micelle-like structures with a core made from the aromatic blocks, and a surface layer made from the poly(conjugated diene) blocks.

The polymerization reactions used to prepare the polymer nanoparticles may be terminated with a terminating agent. Suitable terminating agents include, but are not limited to, alcohols such as methanol, ethanol, propanol, and isopropanol; amines, $MeSiCl_3$, $Me_2SiCl_2$, $Me_3SiCl$, $SnCl_4$, $MeSnCl_3$, $Me_2SnCl_2$, $Me_3SnCl$, and etc. In exemplified embodiments, the polymerization reaction mixture was cooled down and dropped in an isopropanol/acetone solution optionally containing an antioxidant such as butylated hydroxytoluene (BHT). The isopropanol/acetone solution may be prepared, for example, by mixing 1 part by volume of isopropanol and 4 parts by volume of acetone.

The polymer nanoparticles may be functionalized via one or more mechanisms, including functionalization by a specifically designed initiator; functionalization by a specifically designed terminating agent; functionalization by copolymerization of a functionalized comonomer when generating the surface layer and/or the core; or functionalization by modification of any unsaturated groups such as vinyl groups in the poly(conjugated diene) surface layer. Exemplary functional groups that may be incorporated into the polymer nano-particles include, but are not limited to, maleimide, hydroxyl, carboxy, formyl, azocarboxy, epoxide, amino, colonids, bromide, and the like, and the mixture thereof.

In one exemplary embodiment, polymer nanoparticles are made according to the following process. First, a random poly(conjugated diene) block is prepared through the solution polymerization of conjugated diene monomers and mono-vinyl aromatic monomers in a hexane solvent using a butyl-lithium initiator and in the presence of a randomizing agent, oligomeric oxolanyl propanes (OOPs). The conjugated diene monomers may comprise 1,3-butadiene and the mono-aromatic monomers may comprise styrene. Second, a mixture of mono-vinyl aromatic monomers and multiple-vinyl aromatic monomers is then copolymerized with the living poly(conjugated diene) block, optionally using an additional amount of butyl lithium initiator. The mono-vinyl aromatic monomers may comprise styrene and the multiple-vinyl aromatic monomers may comprise divinylbenzene. The reaction is terminated with alcohol and then dried and desolventized. The product is a star-shaped polymer nanoparticle with a crosslinked core.

The polymer nanoparticle may take the shape of nanospheres. The mean diameter of the spheres may be within the range of from about 5 nm to about 200 nm, or from about 5 nm to about 100 nm, or from about 10 nm to about 80 nm, or from about 15 nm to about 60 nm.

The molecular weight (Mn, Mw or Mp) of the poly(conjugated diene) block may be controlled within the range of from about 1,000 to about 1,000,000, within the range of from about 1,000 to about 100,000, or within the range of from about 1,000 to about 80,000.

In a variety of exemplary embodiments, the molecular weight (Mn, Mw or Mp) of the polymer nano-particle may be controlled within the range of from about 100,000 to about 1,000,000,000, or from about 1,000,000 to about 100,000,000. The polydispersity (the ratio of the weight average molecular weight to the number average molecular weight) of the polymer nano-particle may be controlled within the range of from about 1.01 to about 1.3, within the range of from about 1.01 to about 1.2, or within the range of from about 1.01 to about 1.1.

The nano-particles can be produced in two polymerization steps, rather than three steps, i.e., mono-vinyl aromatic monomers and multiple-vinyl aromatic monomers, as a mixture, are polymerized in one step or simultaneously, rather than mono-vinyl aromatic monomers are polymerized first, and then multiple-vinyl aromatic monomers are copolymerized or summoned for crosslinking. This simpler process results in a higher yield of particles than in the three-step process (80-98% vs. 40-85%). The process can efficiently yield a high conversion of monomers to high molecular weight nanoparticles (typically >90% yield of nanoparticles).

Unlike particles made only from vinyl aromatic monomers, the particles of the invention have a vulcanizable surface layer such as a sulfur curable surface layer. The vulcanizable surface layer is a sulfur or peroxide curable surface layer. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur.

The nanoparticles have a core that is sufficiently crosslinked such that the Tg of the nanoparticle core may broadly range from about 150° C. to about 600° C., from about 200° C. to about 400° C., or from about 250° C. to about 300° C. Glass transition temperature may be determined, for example, by a differential scanning calorimeter at a heating rate of 10° C. per minute.

The nano-particles are compounded into a rubber composition, such as a tire rubber tread composition. Rubber compositions may be prepared by mixing a rubber and the nanoparticles with a reinforcing filler comprising silica, or a carbon black, or a mixture of the two, optionally a processing aid, optionally a coupling agent, optionally a cure agent, other desirable or acceptable tire tread components, and an effective amount of sulfur to achieve a satisfactory cure of the composition.

Exemplary rubbers include conjugated diene polymers, copolymers or terpolymers of conjugated diene monomers and monovinyl aromatic monomers. These can be utilized as 100 parts of the rubber in the tread stock compound i.e. make up the entire rubber component of the compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like.

Examples of reinforcing silica fillers which can be used in the vulcanizable elastomeric composition include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. Silica can be employed in the amount of about one to about 100 parts per hundred parts of the elastomer (phr), preferably in an amount of about 5 to 80 phr and, more preferably, in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165 MP0, and J. M. Huber Corporation).

The rubber can be compounded with all forms of carbon black, optionally additionally with silica. The carbon black can be present in amounts ranging from about one to about 100 phr. The carbon black can include any of the commonly available, commercially-produced carbon blacks, but those having a surface are of at least 20 $m^2/g$ and, or preferably, at least 35 $m^2/g$ up to 200 $m^2/g$ or higher are preferred. Among useful carbon blacks are furnace black, channel blacks, and lamp blacks. A mixture of two or more of the above blacks can be used in preparing the carbon black products of the invention. Typical suitable carbon blacks are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 40 phr.

Numerous coupling agent and compatibilizing agent are known for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, and hexyltrimethoxy silane.

Processing oils can be added to the vulcanizable elastomeric composition. Processing oils may be utilized in the amount of 0 phr to about 70 phr. The processing oil may be added to the composition by itself, or may be added in the form of an oil extended elasatomer. Exemplary processing oils include aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L.

It is readily understood by those having skill in the art that the rubber composition can be compounded by methods generally known in the rubber compounding art, such as mixing the rubber(s) with various commonly used additive materials such as, for example, curing agents, activators, retarders and accelerators processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the rubber composition, the additives mentioned above are selected and commonly used in the conventional amounts.

In one embodiment, the nano-particles are added to a tire tread that comprises at least one rubber. Exemplary rubbers include conjugated diene polymers, copolymers or terpolymers of conjugated diene monomers and mono-vinyl aromatic monomers. These can be utilized as 100 parts of the rubber in the tread stock compound i.e. make up the entire rubber component of the compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like.

In another embodiment, a tire tread comprises at least two rubbers, each of which is comprised of at least one conjugated diene monomer unit and at least one mono-vinyl aromatic monomer unit. Exemplary conjugated diene monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixture thereof is used as the conjugated diene monomer. Exemplary mono-vinyl aromatic units include, but are not limited to styrene, ethylvinylbenzene, α-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 18; and mixtures thereof.

The nano-particles can be used in place of the (mono-vinyl aromatic-conjugated diene) copolymer rubber that has a mono-vinyl aromatic content that most closely matches the mono-vinyl aromatic content of the surface layer of the nano-particles. The mono-vinyl aromatic content of the surface layer of the nano-particles can be between about 50 percent and about 150 percent, or between about 75 percent and about 125 percent, or between about 90 percent and 110 percent that of the mono-vinyl aromatic content of one of the (alkenylbenzene-conjugated diene) copolymers. This allows for the incorporation of the nano-particles into the rubber without significantly impacting the overall mono-vinyl aromatic content of the rubber matrix.

The nano-particles can be added to a rubber composition at a level of less than about 50 phr, less than about 30 phr, or less than about 20 phr.

The core of the nano-particle acts as a filler dispersed in the rubber. The filler effect is attributed to the relative hardness of the core in comparison to the rubber matrix.

EXAMPLES

Three rubber stocks were prepared using the formulations shown in Table 1. Stocks 2 and 3 had 7 phr and 14 phr, respectively, of nano-particles of the present invention incorporated in place of the styrene-butadiene rubber with the most similar styrene content. The properties of the nano-particles used are shown in Table 2. FIG. 1 shows a DSC analysis of the nano-particles. FIG. 1 indicates that the surface layer of the nano-particles had a Tg of −37° C. while the Tg of the core was undetectable, meaning the Tg of the core was above 200° C.

Viscoelastic properties of the three cured rubber stocks are shown in Table 3 wherein the results were obtained from temperature sweep experiments. Temperature sweep experiments were conducted using a spectrometer at a frequency of 50 Hz and a 0.2% strain for the temperature ranging from −50° C. to −5° C., and a 1% strain for the temperature ranging from −5° C. to 60° C.

Rubber compounds 2 and 3 which contained the nano-particles exhibited an 11% and 25% increase in E' at 30° C., respectively, which is indicative of an improvement in cornering and steering response. Despite the substantial increase in the dynamic storage modulus, stocks 2 and 3 showed only a 2% and 10% increase in tan δ at 60° C., respectively, which is indicative of slightly higher rolling resistance. Thus, the nano-particles allow for a substantial improvement in the dynamic storage modulus without significantly impacting the hysteresis of the compound.

TABLE 1

Compound Formulations

| Component (phr) | Comparative Stock 1 | Stock 2 | Stock 3 |
|---|---|---|---|
| Solution SBR[1] | 67 | 67 | 67 |
| Emulsion SBR[2] | 33 | 26 | 19 |
| Nanoparticles[3] | | 7 | 14 |
| Carbon Black (N134) | 49.5 | 49.5 | 49.5 |
| Silica | 30 | 30 | 30 |
| Bis-3-triethoxysilylpropyl disulfide | 2.4 | 2.4 | 2.4 |
| Hydrocarbon Resin | 8 | 8 | 8 |
| Oil | 25.13 | 25.13 | 25.13 |
| Wax | 2 | 2 | 2 |
| AO | 1.8 | 1.8 | 1.8 |
| Stearic Acid | 1 | 1 | 1 |
| Processing Aid | 0.8 | 0.8 | 0.8 |
| Zinc Oxide | 2.5 | 2.5 | 2.5 |
| Sulfur | 1.85 | 1.85 | 1.85 |

TABLE 1-continued

Compound Formulations

| Component (phr) | Comparative Stock 1 | Stock 2 | Stock 3 |
|---|---|---|---|
| N-cyclohexyl-2-benzothiazole sulfenamide | 1.8 | 1.8 | 1.8 |
| Diphenylguanidine | 0.8 | 0.8 | 0.8 |
| 2,2-Dibenzothiazole disulfide | 0.4 | 0.4 | 0.4 |

[1]Solution SBR (40.5% styrene)
[2]Emulsion SBR (23.5% styrene)
[3]Nanoparticle properties shown in Table 2

TABLE 2

Nano-Particle Properties

| | |
|---|---|
| Surface Layer Tg (° C.) | −37 |
| Core % of Total Molecular Weight | 31.3 |
| Core Composition | 86% styrene/14% divinylbenzene |
| Surface Layer Composition | styrene-butadiene |
| Surface Layer Molecular Weight | 119,000 |
| % Styrene in Surface Layer | 25% |

TABLE 3

| | Comparative Stock 1 | Stock 2 | Stock 3 |
|---|---|---|---|
| E* @ −20° C. (Mpa) | 997 | 1182 | 1277 |
| E' @ 0° C. (Mpa) | 48.6 | 51.9 | 58.3 |
| E' @ 30° C. (Mpa) | 19.5 | 21.6 | 24.4 |
| Tan δ @ 0° C. | 0.749 | 0.733 | 0.725 |
| Tan δ @ 30° C. | 0.436 | 0.442 | 0.454 |
| Tan δ @ 60° C. | 0.314 | 0.320 | 0.345 |

An exemplary embodiment has been described. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A composition comprising:
   (a) at least two (mono-vinyl aromatic-conjugated diene) copolymer rubbers, and
   (b) a polymeric nano-particle comprising a poly(mono-vinyl aromatic) core and a poly(mono-vinyl aromatic-conjugated diene) surface layer;
   wherein the core of the polymeric nano-particle has a glass transition temperature (Tg) of between about 150° C. and about 600° C., and
   the poly(mono-vinyl aromatic-conjugated diene) surface layer of the polymeric nano-particle comprises a mono-vinyl aromatic content that is between about 50 percent and about 150percent that of the mono-vinyl content of one of the (mono-vinyl aromatic-conjugated diene) copolymer rubbers.

2. The composition of claim 1, wherein the surface layer of the polymeric nano-particle comprises a mono-vinyl aromatic content that is between about 75 percent and 125 percent that of the mono-vinyl aromatic content of one of the (mono-vinyl aromatic-conjugated diene) copolymer rubbers.

3. The composition of claim 1, wherein the surface layer of the polymeric nano-particle comprises a mono-vinyl aromatic content that is between about 90 percent and 110 percent that of the mono-vinyl aromatic content of one of the (mono-vinyl aromatic-conjugated diene) copolymer rubbers.

4. The composition of claim 1, wherein said poly(mono-vinyl aromatic) core comprises polystyrene, and said poly(mono-vinyl aromatic-conjugated diene) surface layer comprises a poly(styrene-butadiene).

5. The composition of claim 1, wherein the polymeric nano-particle has a mean average diameter between about 5 and 200 nanometers.

6. The composition of claim 1, wherein the polymeric nano-particle has a mean average diameter of between about 5 and 100 nanometers.

7. The composition of claim 1, further comprising a low PCA processing oil having a polycyclic aromatic content of less than 3 percent by weight as determined by the IP346 method.

8. A tire comprising a tread, wherein said tread comprises:
   (a) at least two (mono-vinyl aromatic-conjugated diene) copolymer rubbers, and
   (b) a polymeric nano-particle comprising a poly(mono-vinyl aromatic) core and a poly(mono-vinyl aromatic-conjugated diene) surface layer,
   wherein the core of the polymeric nano-particle has a glass transition temperature (Tg) of between about 150° C. and about 600° C., and
   the poly(mono-vinvl aromatic-conjugated diene) surface layer of the polymeric nano-particle comprises a mono-vinyl aromatic content that is between about 50 percent and about 150 percent that of the mono-vinyl content of one of the (mono-vinyl aromatic-conjugated diene) copolymer rubbers.

9. The tire of claim 8, further comprising a low PCA processing oil having a polycyclic aromatic content of less than 3 percent by weight as determined by the IP346 method.

10. The tire of claim 8, wherein said rubber comprises at least two (mono-vinyl aromatic-conjugated diene) copolymer rubbers, and the surface layer of the polymeric nano-particle comprises a mono-vinyl aromatic content that is between about 50 percent and about 150 percent that of the mono-vinyl aromatic content of one of the (mono-vinyl aromatic-conjugated diene) copolymer rubbers.

11. The tire of claim 8, wherein the surface layer of the polymeric nano-particle comprises a mono-vinyl aromatic content that is between about 75 percent and 125 percent that of the mono-vinyl aromatic content of one of the (mono-vinyl aromatic-conjugated diene) copolymer rubbers.

12. The tire of claim 8, wherein said at least two (mono-vinyl aromatic-conjugated diene) copolymer rubbers are each styrene-butadiene copolymers.

13. The tire of claim 8, wherein the wherein said poly(mono-vinyl aromatic) core comprises polystyrene, and said poly(mono-vinyl aromatic-conjugated diene) surface layer comprises a poly(styrene-butadiene).

14. The composition of claim 1, wherein the core of the polymeric nano-particle has a Tg of between about 200° C. and about 400° C.

15. The composition of claim 1, wherein the core of the polymeric nano-particle has a Tg of between about 250° C. and about 300° C.

16. The composition of claim 5, wherein the polymeric nano-particle is present at a level between about 1 phr and about 50 phr.

17. The tire of claim 8, wherein the core of the polymeric nano-particle has a Tg of between about 200° C. and about 400° C.

18. The tire of claim 8, wherein the core of the polymeric nano-particle has a Tg of between about 250° C. and about 300° C.

19. The tire of claim 8, wherein the polymeric nano-particle is present at a level between about 1 phr and about 50 phr.

20. The tire of claim 8, wherein the polymeric nano-particle has a mean average diameter of between about 5 and 100 nanometers.

21. The composition of claim 1, wherein the core is cross-linked with a multiple-vinyl aromatic cross-linking agent.

22. The tire of claim 8, wherein the core is cross-linked with a multiple-vinyl aromatic cross-linking agent.

* * * * *